(12) United States Patent
Kalavai

(10) Patent No.: US 8,891,507 B1
(45) Date of Patent: Nov. 18, 2014

(54) SYNCHRONIZING TRANSMISSION CHANNELS IN A WIRELESS NETWORK

(76) Inventor: Raghunath Kalavai, Bedminster, NJ (US)

( * ) Notice: Subject to any disclaimer, the term of this patent is extended or adjusted under 35 U.S.C. 154(b) by 134 days.

(21) Appl. No.: 13/481,331

(22) Filed: May 25, 2012

Related U.S. Application Data

(60) Provisional application No. 61/490,213, filed on May 26, 2011.

(51) Int. Cl.
*H04J 3/06* (2006.01)

(52) U.S. Cl.
USPC ......................................................... 370/350

(58) Field of Classification Search
CPC .............. H04W 72/12; H04W 72/121; H04W 72/1226; H04W 72/1236; H04W 56/00; H04W 56/001; H04W 56/002; H04W 56/0005; H04W 56/0025; H04W 72/1231; H04L 5/007; H04L 27/206; H04J 11/00; H04J 3/06

USPC ......... 370/252, 328, 203, 208, 312, 321, 324, 370/345, 348, 350, 498, 503, 507, 509–514, 370/520; 455/91, 517
See application file for complete search history.

(56) References Cited

U.S. PATENT DOCUMENTS

| | | | |
|---|---|---|---|
| 8,023,904 B2 * | 9/2011 | Viswanath et al. | 455/91 |
| 2010/0208608 A1 * | 8/2010 | Wang | 370/252 |
| 2011/0319116 A1 * | 12/2011 | Iwamura et al. | 455/517 |
| 2012/0039252 A1 * | 2/2012 | Damnjanovic et al. | 370/328 |

* cited by examiner

*Primary Examiner* — Kwang B Yao
*Assistant Examiner* — Syed M Bokhari

(57) ABSTRACT

The present invention relates to a method to improve the communication performance of a network of transceivers stations. The method comprises of a plurality of transceiver stations transmitting data to a target station, calculating correction factors at the transmitting stations, and correcting the transmitted signals for at least one of the transmitter stations so that the channels for the transmitted signals are synchronized.

13 Claims, 10 Drawing Sheets

SYNCHRONIZING TRANSMISSION CHANNELS IN A WIRELESS NETWORK

CROSS-REFERENCE TO RELATED APPLICATIONS

This application claims the benefit of application No. 61/490,213 filed 26 May, 2011, by the present inventor, which is incorporated by reference.

FEDERALLY SPONSORED RESEARCH

None

SEQUENCE LISTING

None

FIELD OF INVENTION

The present invention relates to a method to improve the wireless communication performance of a network of transceiver stations. In particular the present invention relates to improving the communication performance when a plurality of transceiver stations are transmitting signals to the same target transceiver station.

BACKGROUND

Demand on cellular network capacity is growing very fast with the growth of smart phones and the wide usage of video applications. There are projections that the data traffic on the cellular wireless system will grow by 26× in 5 years. At the same time the revenue per bit ($/MByte) for service providers is going down. With spectrum being limited and expensive, capacity has to be increased by squeezing more bits into the same bandwidth. Long term Evolution (LTE) standard from the 3GPP standard body has improved the amount of data that can be packed in a given bandwidth (bits/Hz), but the improvement is incremental. The standards body 3GPP has charted out a few schemes to improve the capacity of the system, such as, Beamforming, MIMO, MU-MIMO (or network MIMO) coordinated multi-point systems (CoMP) (see 3GPP standards documents, including 3GPP TS 36.211: "Evolved Universal Terrestrial Radio Access (E-UTRA); Physical channels and modulation"). The recent book "LTE—The UMTS Long Term Evolution from theory to practice" by S. Sesia et al (Wiley 2011), gives a good background on the subject. The other approach to improve capacity is to use small cells (Pico cells, Femto cells). By more frequency reuse capacity can potentially be improved. However, apart from increasing infrastructure costs, small cells exacerbate interference between cells, and cell edge coverage becomes a bottleneck. All these techniques have practical limitations and these have to be fixed before any large capacity growth is possible.

The transmit channel is the channel as seen by the signals that the transmitter sends. The transmit channel can be estimated at the receiver. However, the transmit channel is not known at the transmitter. If the transmit channel information is available at the transmitter then it can optimize the signal transmission to match its channel. In many cases the receiver station may not be able to send back the channel information due to constraints on bandwidth.

In some cases there may be multiple stations transmitting data to the same target station. In these cases the transmission efficiency can be improved if the transmit channels for these transmitting stations can be synchronized. In one embodiment synchronization involves matching the channels to improve signal to noise ratio. The transmitter and receivers in the stations are physical devices that change characteristics with time. Calibration of the system is used to correct for these issues. Phase characteristics of transmitters and receivers can change very quickly and such calibration techniques become impractical since they would need to be done frequently. The costs in terms of bandwidth required would be high. Some radio stations are connected with data links apart from communicating over the wireless channel. For such stations sending channel information data to other stations over the data link is feasible. However, there are some stations which do have the data link. An example of such a system is a mobile station. These stations can only communicate over the wireless link. The bandwidth on the wireless link is limited. For such stations sending the channel data to other stations will reduce bandwidth that the user has.

SUMMARY

According to one aspect, it is a method of synchronizing then transmission channels of signals from a set of stations, to a target station, so that the communication performance is improved.

According to one aspect, it is a method of synchronizing signal transmissions from a set of stations, including a plurality of stations, to a predetermined target station, by exchanging information that characterize the transmission conditions among the set of stations, via a data link.

According to one aspect, a set of stations transmit signals to a target station, and comprises identifying one of the set of stations as a reference node, and determining scaling factors at the reference node, for each of the remaining stations in the said set of stations, and for plurality of sub-carriers, based on channel for signals received from the other stations in the set and the channel for the signal from the target station. The scaling factors are then sent from the reference node via a data link to the corresponding station in the set of stations. The signals transmitted to the target station from the stations in the said set of stations, except for the reference node, for the plurality of sub-carriers, is scaled by the corresponding correction factors which are calculated using the received scaling factor and the channel for signals from the reference node and the target station.

In another aspect some of the stations have multiple antennas each and the synchronization of channels is achieved for plurality of antennas by identifying one antenna on one station as a reference node, and calculating the correction factors for the antennas on all other stations in the set of stations. For the other antennas in the same station as the reference node, a first correction factor is determined with respect to an antenna on a different station, considering it as a temporary reference node, and then combining the first correction factor with the correction factor previously determined for the temporary reference node, to give a final correction factor. Finally, the signals from all antennas that are transmitted to the target station are corrected with corresponding correction factors.

According to one aspect, multiple antennas in the same station are synchronized by using an antenna on a different station as a reference.

In another aspect the correction factors are applied along are with other processing of the signals.

According to one aspect, transmissions from two transceiver stations to a target transceiver station are synchronized by determining at the first station a scaling factor based on the channels for signals received from the second station and target station, and determining at the said second station a scaling factor based on channels for signals received from the first station and target station, and correcting the signal transmitted from the said first station to the said target station by the scaling factor calculated at the said first station, and correcting the signal transmitted from the said second station to the said target station by the scaling factor calculated at the said second station.

In one aspect the phase of the scaling factors and correction factors is utilized.

In another aspect of a single carrier modulation is used.

According to one aspect, a subset of stations have multiple antennas.

In another aspect the transmitter and receivers parts of the transceiver stations are not collocated.

In another aspect the transmitters of transceiver stations are turned off for periods of time to allow the receivers of the said transceiver stations to operate.

DRAWINGS

Figure 4:
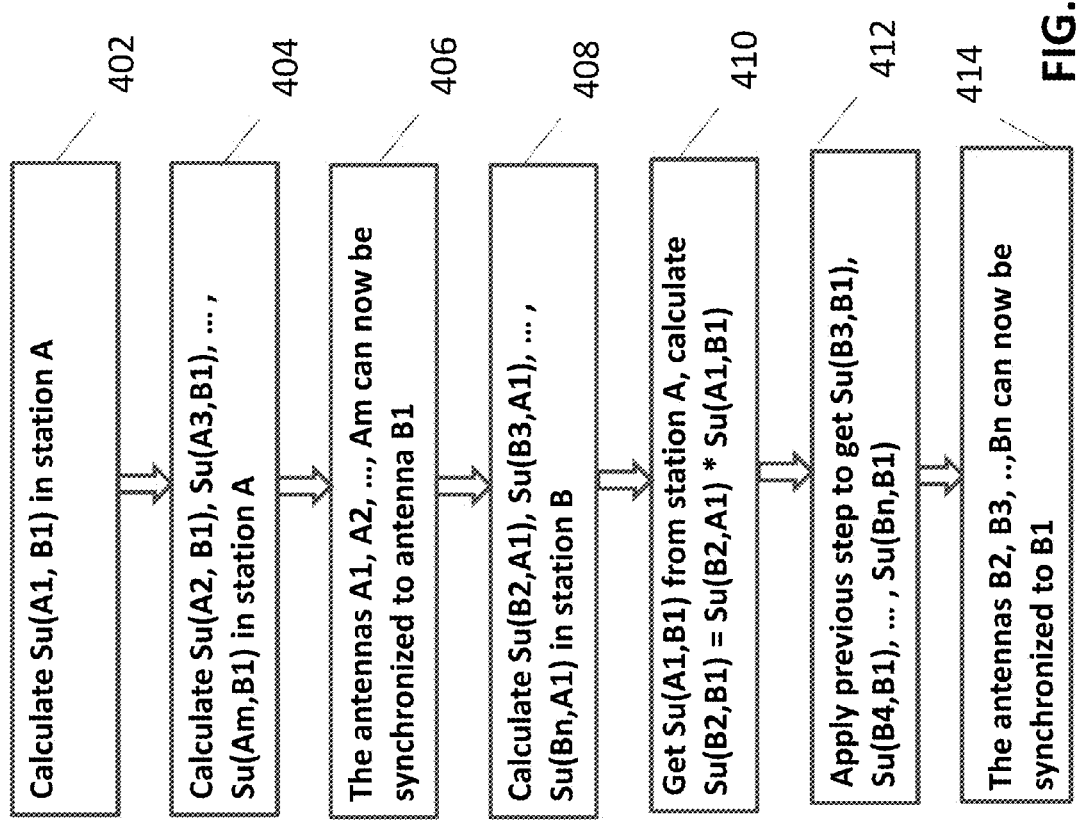
Figure 5:
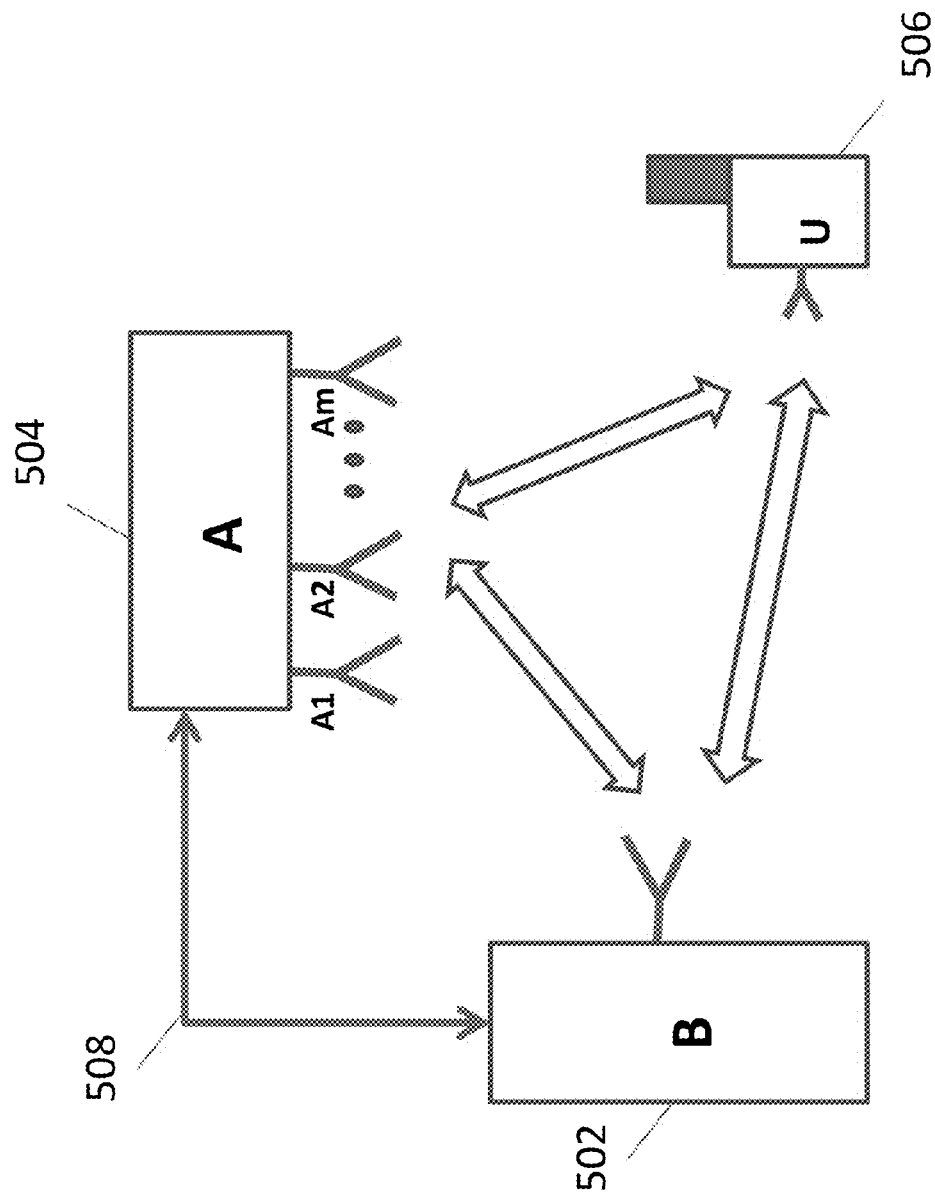

FIG. 4 outlines the steps to synchronize channels between stations with multiple antennas according to one embodiment FIG. 5 illustrates an example configuration of a wireless network.

Figure 6:
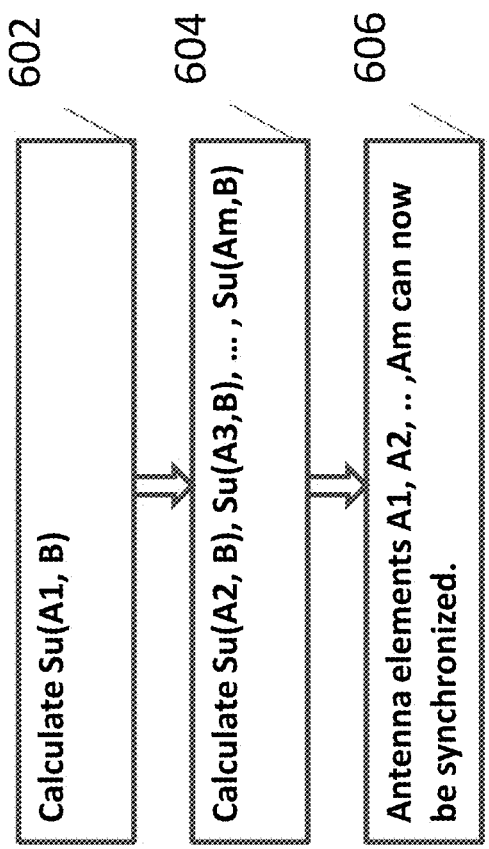
Figure 7:
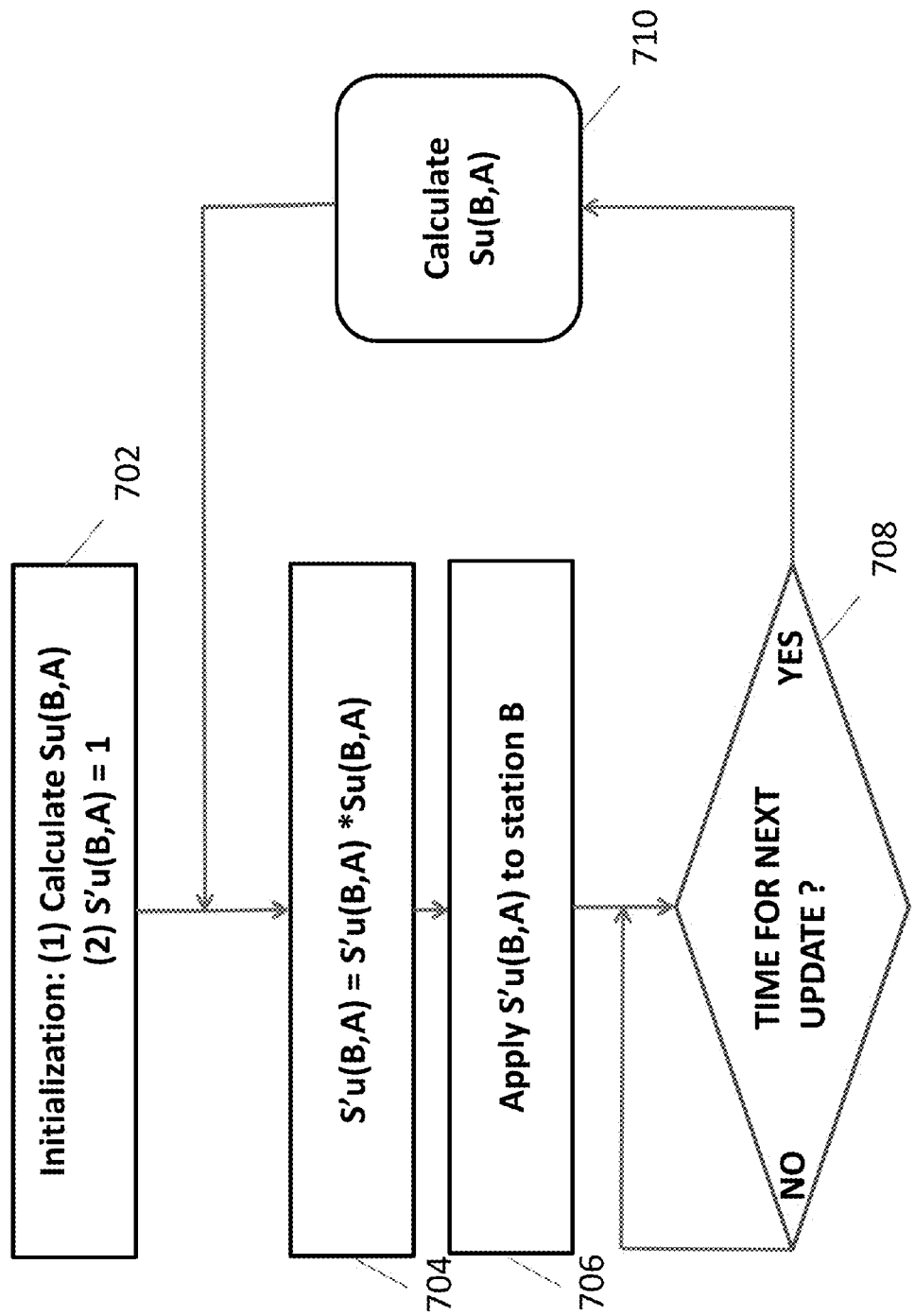
Figure 8:
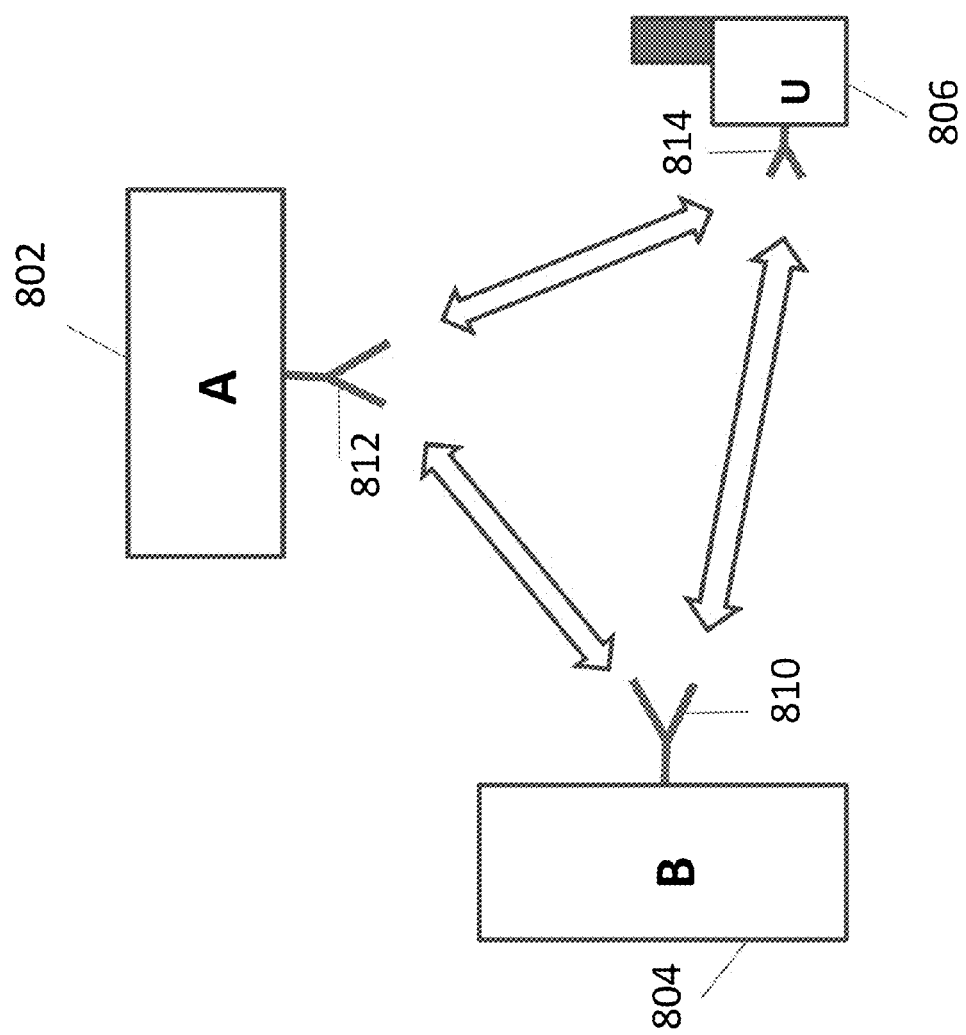

FIG. 6 outlines the steps to synchronize channels between multiple antennas of a station according to one embodiment FIG. 7 illustrates an example of keeping the stations synchronized over multiple iterations of calculations of correction factor FIG. 8 illustrates an example configuration for a wireless network for one embodiment.

Figure 9:
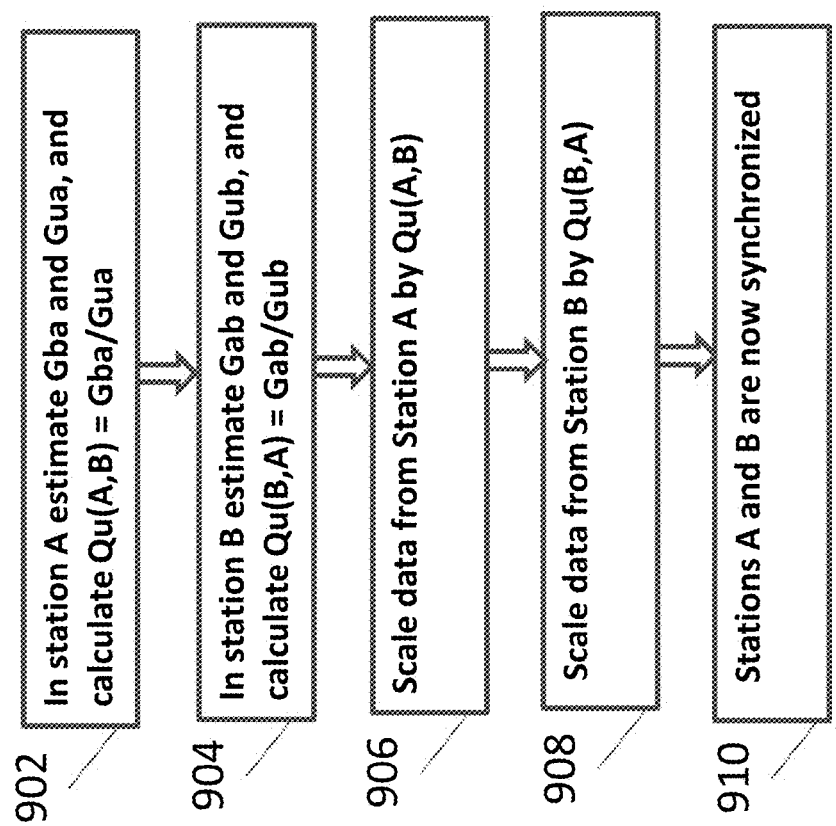

FIG. 9 illustrates the steps to synchronize channels according to one embodiment.

DETAILED DESCRIPTION

In one aspect of one embodiments it is a method of synchronizing the channels for transmission of signals from a set of stations, to a target station, so that the communication performance is improved.

In another aspect, it is a method of synchronizing signal transmissions from a set of stations, including a plurality of stations, to a predetermined target station, by exchanging information that characterize the transmission conditions among the set of stations, via a data link.

According to one aspect, a set of stations transmit signals to a target station, and comprises identifying one of the set of stations as a reference node, and determining scaling factors at the reference node, for each of the remaining stations in the said set of stations, and for plurality of sub-carriers, based on channel for signals received from the other stations in the set and the channel for the signal from the target station. The scaling factors are then sent from the reference node via a data link to the corresponding station in the set of stations. The signals transmitted to the target station from the stations in the said set of stations, except for the reference node, for the plurality of sub-carriers, is scaled by the corresponding correction factor which is calculated using the received scaling factor and the channel for signals from the reference node and the target station.

Figure 1A:
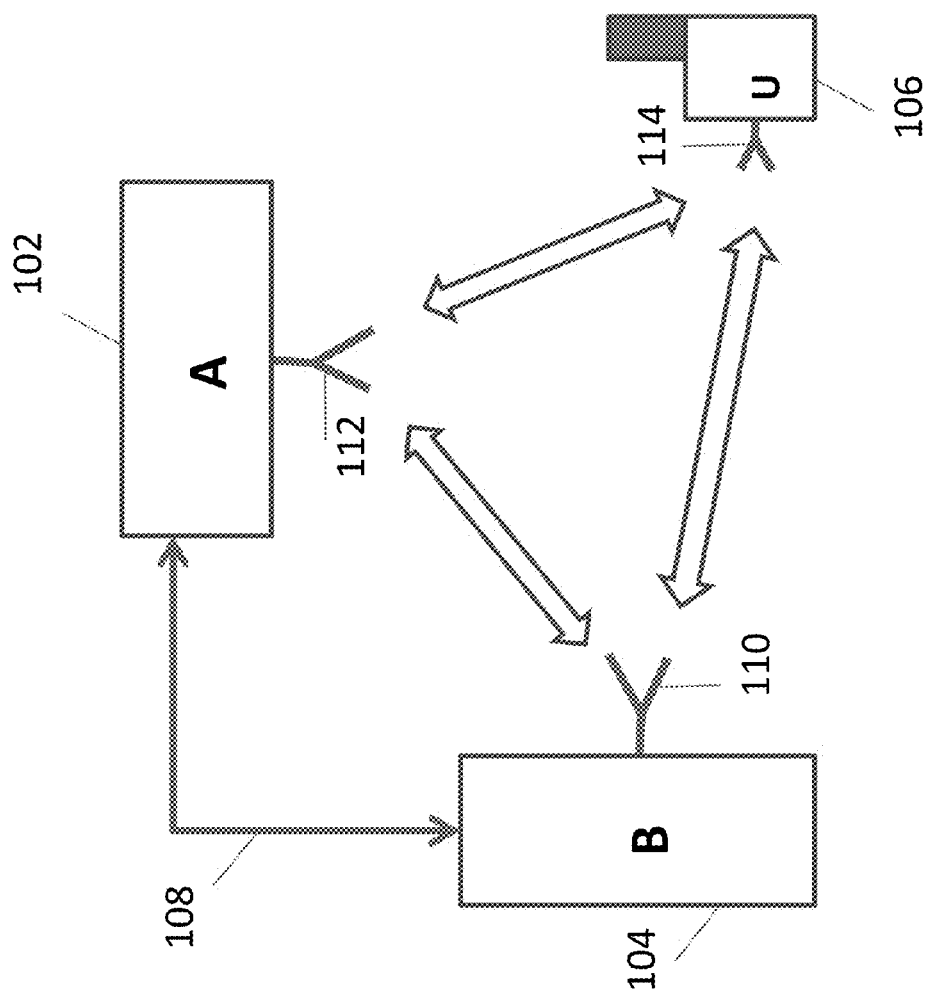
FIG. 1a illustrates an example configuration of a wireless communication network.

FIG. 1a illustrates three nodes, station A 102, stations B 104 and station U 106, communicating over a wireless communication network, according to one embodiment. In this example each of the stations has an antenna for wireless transmission of signal. The antennas for stations A, B and C are represented as 112, 110 and 114, respectively, in the figure. All three stations are transceivers, and can hence transmit and receive signals over the air. The stations A 102 and station B 104 also have a data link 108 to communicate data between them, in addition to communicating over the wireless channel. This data link is shown as a wired link in this example but could be any data link to communicate data. The station U 106 does not have such a data link in this example.

Figure 1B:
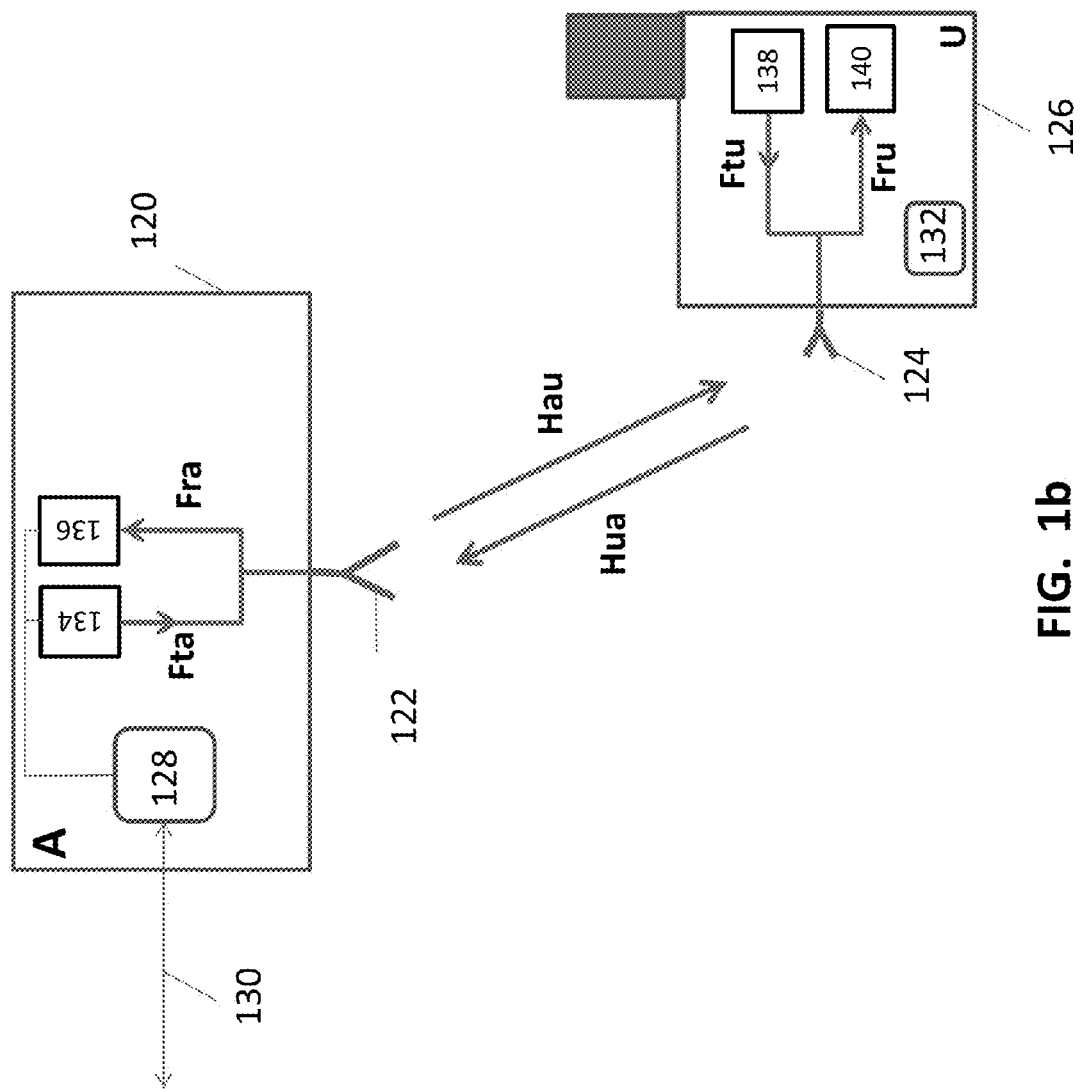
FIG. 1b shows some details of the communication channel for part of the wireless communication network FIG. 2 outlines the steps to synchronize channels according to one embodiment

FIG. 1b illustrates some aspects of the communication channel from station A 120 to station U 126, including some of the internal processing blocks. In station A 120 the transmit unit, represented by 134, and the receive unit, represented by 136 are also shown. The block 128 represents the control and processing unit in station A. When station A sends signals to station U, the data passes through the transmit path in station A, through the antenna 122, and then through the wireless channel represented by Hau, and is then received by station U 126, after passing through antenna 124, and the receive unit 140. The control and processing unit for station U is represented by 132.

According to one aspect, the wireless communication is based on OFDM (orthogonal frequency division multiplexing) modulation, operating in the time division duplexing (TDD) mode. In OFDM the signals are transmitted over multiple sub-channels or sub-carriers in the frequency domain. In TDD (time division duplexing) mode of operation, the transmitter and receiver parts of the station operate in the same frequency band. Here the communication of signals in both directions (uplink and downlink) use the same frequency band. They share the frequency band by a pre-determined time sharing scheme.

A known pilot signal is used in some cases to aid in channel estimation. When a pilot signal p is transmitted from station A to station U on a sub-channel, the received signal at station U can be represented by p*Gau, where Gau represents the channel for the full path, and * represents a multiplication operation. Since p is a known quantity, Gau can be estimated in station U from the received pilot signal. The channel that the signal traverses from station A to station U can be represented as $Gau=Fta*Hau*Fru.$ Here Fta represents the channel in the transmit unit 134 in station A, and includes the antenna 122. This includes any RF, analog or digital processing that a signal undergoes in the transmit path. Fru represents the channel in the receive path at station U. This includes the radio frequency (RF), analog and digital processing in station U from antenna 124 through to the receive unit 140. Note that the quantities Fta and Ftu may vary significantly with time. The quantity Hau represents the physical over-the-air channel from antenna 122 in station A to antenna 124 in station U. The station U can estimate the value of Gau based on the received pilot signals from station A.

We can represent the full channel from station U to A as $Gua=Ftu*Hua*Fra,$ where Ftu is the transmit path channel in station U, and Fra is the receive path channel in station A, and Hua is the physical channel from antenna 124 in station U to antenna 122 in station A. The station A can estimate the value of Gau from the pilot signals received from station U.

The channel from station B to station U can be represented by $$Gbu = Ftb * Hbu * Fru,$$

where Ftb is the transmit path channel in station B, Hbu is the physical channel between the two stations, and Fru is the receive path channel in station U. Similarly, when station A and B are communicating with each other, we have the full channel from station A to station B as $$Gab = Fta * Hab * Frb,$$

and the full channel from station B to station A as $$Gba = Ftb * Hba * Fra.$$

In the above Hab is the physical over-the-air channel from A to B, and Hba is the physical over-the-air channel from B to A.

Figure 2:
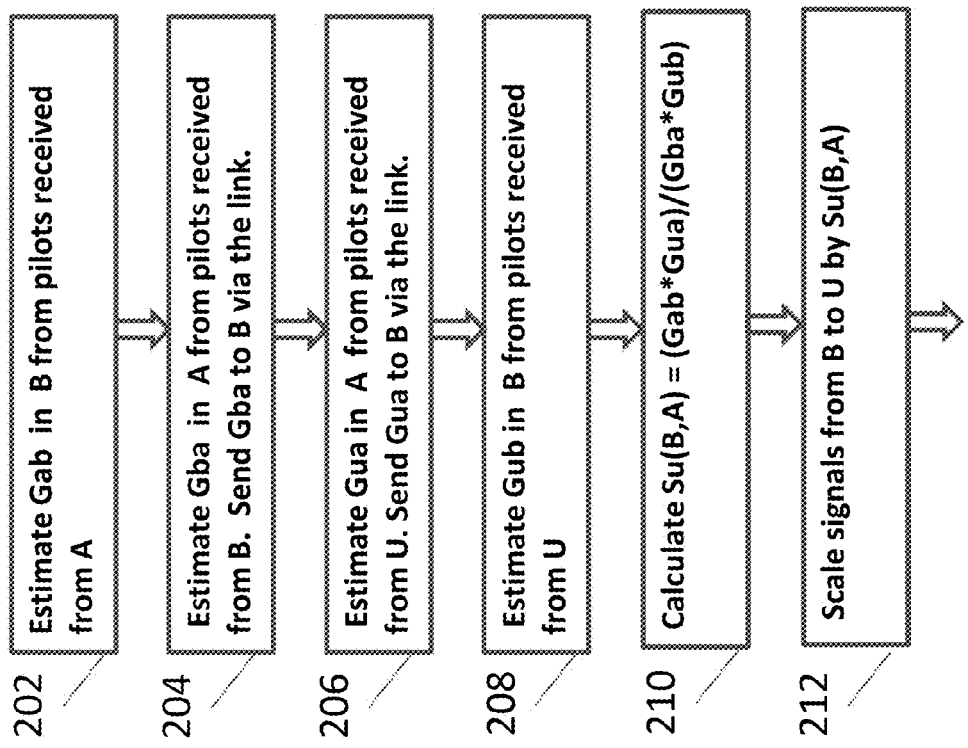

FIG. 2 illustrates some aspects of the embodiment. Station U is the target station to which station A and station B transmit signals. The station B estimates the value of the full channel Gab by receiving the pilots from station A, as shown in step 202. Station A estimates the full channel Gba using the pilots received from station B. Station A sends the value of Gba to station B by using the data link between station A and station B (step 204). Station A also estimates the value of Gua and sends it to station B over the same data link (step 206). Here the values Gba and Gua are the scaling factors that station A sends to station B. The two quantities can also be combined into one scaling factor Gua/Gba and sent to station B in another exemplary embodiment. Station B also calculates the value of Gub (step 208). Next station B calculates the correction factor $$Su(B,A) = (Gab * Gua)/(Gba * Gub).$$

When the signals from station B to station U are scaled by Su(B,A) (step 212), the effective channel is $$Gbu * Su(B,A) = \\ (Ftb * Hbu * Fru * Fta * Hab * Frb * Ftu * Hau * Fra)/ \\ (Ftb * Hba * Fra * Ftu * Hub * Frb)$$

In a TDD transmission, the physical channel is reciprocal, and hence, Hbu=Hub, and Hab=Hba. Applying this we get $$Gbu * Su(B,A) = Fru * Fta * Hau = Gau$$

Thus, the channel from station B can be synchronized to channel from station A. Station A is used as a reference node to synchronize the transmissions from station B and station A to the target station U. Here station A and station B are two stations in the set of stations transmitting to target station U. The set of stations can be comprised of more than two stations. One aspect of this embodiment is that the process of calculation of Su(B,A) can be repeated at time intervals to keep track of time varying characteristics of the channel.

Note that the processing of operations and calculations may be done in alternate ways and in other sub-blocks and entities. Also, more than two stations can be synchronized. A third station which has data link to station A can now be synchronized to it, and then all three stations will be synchronized. Note also that in some cases the scaling factor may include other criteria, and hence may be different from the scaling factor as defined here. The knowledge of the scaling factor defined here can be used, in some cases, to achieve other goals that improve communication signals.

In another aspect of another embodiment, some of the stations have multiple antennas each and the synchronization of channels is achieved for plurality of antennas by identifying one antenna on one station as a reference node, and calculating the correction factors for the antennas on all other stations in the set of stations. For the other antennas in the same station as the reference node a first correction factor is determined with respect to an antenna on a different station, considering it as a temporary reference node, and then combining the first correction factor with the correction factor previously determined for the temporary reference node, to give a final correction factor. Finally, the signals from all antennas that are transmitted to the target station are corrected with corresponding correction factors.

Figure 3:
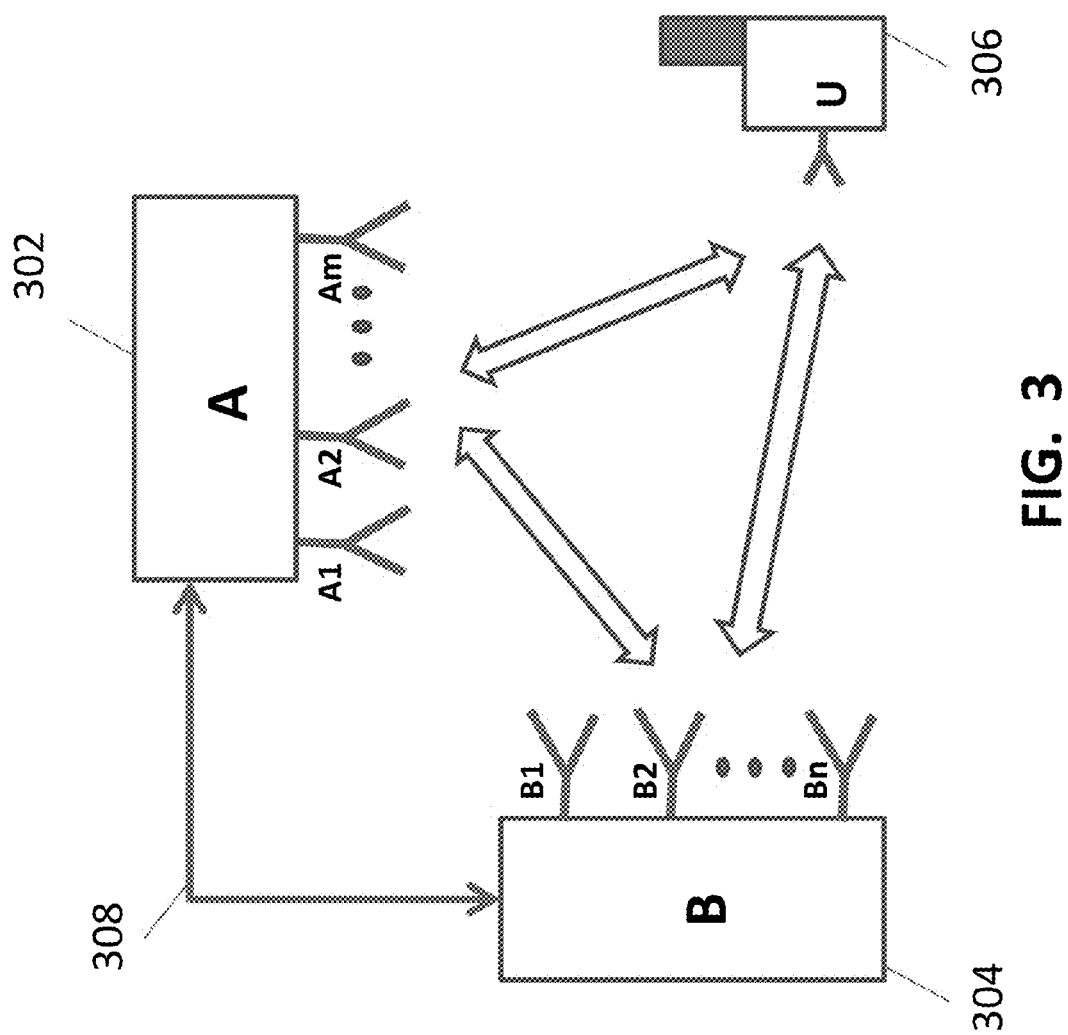
FIG. 3 illustrates an example of a wireless network that includes multiple antennas on some of the stations.

FIG. 3 illustrates a configuration where the stations A 302 and station B 304 have multiple antennas. In this example, station A 302 has m antennas which are referenced as A1, A2, ..., Am. The station B in this example has n antennas which are referenced as B1, B2, ..., Bn. The stations A and B are connected by a data link 308. The station U 306 in this example has a single antenna. Station U in this exemplary embodiment is the target station, and station A and station B transmit signals to it.

FIG. 4 illustrates another exemplary embodiment using the configuration shown in FIG. 3 as an example. The antennas A1 and B1 are synchronized by scaling antenna A1 data by correction factor Su(A1,B1), given by (step 402)

$$Su(A1,B1) = (Gb1a1 * Gub1)/(Ga1b1 * Gua1),$$

Where Gb1a1 is the channel for data transmitted from antenna B1 to antenna A1, Gub1 is the channel for data transmitted from station U to antenna B1, Ga1b1 is the channel for data transmitted from A1 to B1, and Gua1 is the channel for data transmitted from station U to antenna A1. In the above example, station B sends data Gub1 and Ga1b1 to station A. Here station B1 is used as the reference node.

Similarly, calculate and scale data from antennas A2, A3, ..., Am by Su(A2,B1), Su(A3,B1), ... SU(Am,B1) (as shown in step 404). Now the antennas A1, A2, ..., Am are synchronized with B1 for all transmissions to station U.

Next calculate in station B (step 408 and step 410), after receiving Su(A1,B1) from station A $$Su(B2,B1) = Su(B2,A1) * Su(A1,B1)$$

By scaling B2 with this correction factor value it can be synchronized to B1. Note that this method of indirect calculation is used since, in some cases, the antennas in the same station, such as B1 and B2, cannot send wireless data to each other. Similarly, calculate Su(B3,B1), Su(B4,B1), ... Su(Bn,B1) (step 412). Now B2, B3, ..., Bn can be synchronized with B1 (step 414). All antennas can now be synchronized to B1. In this step station A1 is used as a temporary reference node.

Note that the above process of calculation of Su(B,A) is described for a single sub-channel as an example. It can be applied to all sub-channels.

According to another embodiment, multiple antennas in the same station are synchronized by using an antenna on a different station as a reference. FIG. 5 illustrates an example of this embodiment. Here the station A 504 has multiple antennas (A1, A2, ... Am), and is communicating with station U 506. To synchronize all its antennas, station A uses a nearby Station B 502, as a reference station. The steps used for this embodiment are shown in FIG. 6. Station A calculates SU(A1,B) to synchronize A1 to B. Similarly by calculating Su(A2,B), Su(A3,B) ... Su(Am,B) and applying them to the respective antennas, all antennas of station A are synchronized.

FIG. 7 illustrates an exemplary embodiment of updating the correction factors over multiple iterations of measurements. The configuration in FIG. 1a is used as an example. At initialization (step 702), the value of Su(B,A) is calculated, and the S'u(B,A) is set to 1. Here S'u(B,A) represents an aggregated correction factor based on multiple calculations of the correction factor Su(B,A). Note the S'u(B,A) is the actual correction factor applied to the antenna in station B. Every iteration the value of S'u(B,A) is updated by multiplication by Su(B,A) as shown in step 704. Next S'u(B,A) is applied to antenna in station B. The system waits for the next iteration of update calculation to begin (step 708). After that a new value of Su(B,A) is calculated (step 710) and S'u(B,A) is updated again (step 704).

FIG. 8 illustrates a configuration of another embodiment with three stations A, B and U. The station A 802, station B 804 and station U 806 are part of a wireless network in this example, and communicate through antennas 812, 810 and 814 respectively.

FIG. 9 illustrates the embodiment using the configuration shown in FIG. 8 as an example. Station A calculates Gba and Gua, and computes a correction factor (step 902)

$$Qu(A,B)=Gba/Gua$$

Station B calculates the value of Gab and Gub, and computes a correction factor (step 904)

$$Qu(B,A)=Gab/Gub$$

The correction factor Qu(A,B) is applied to data transmitted from station A to station U (step 906). This correction factor Qu(B,A) is applied to data transmitted from station B to station U (step 906). The channels for stations A and B while transmitting to target station U are now synchronized. Here the data link was not required to achieve the channel synchronization of stations A and B while transmitting to target station U.

In one aspect of another embodiment the phase of the scaling factors and correction factors is utilized. In some cases only the phase of the channels are synchronized when a set of stations are transmitting to a target station. This reduces the bandwidth needed over the data link, when a data link is used.

In one aspect of another embodiment a single carrier modulation is used. In an exemplary single carrier modulation there is a single sub-carrier or sub-channel. The method of synchronizing channels is implemented by using scaling factors and correction factors which are filters.

In another aspect of one embodiment the transmitters of transceiver stations are turned off for periods of time to allow the receivers of the said transceiver stations to operate. In some cases it may not be possible to transmit and receive at the same time. The transmitter may be turned off at predetermined periods of time to enable reception of signals from other stations. The transmitter in one embodiment would turn off even though it was scheduled to transmit, to allow the receiver in the same station to receive signals from other stations.

In one aspect of another embodiment, the transmitter and receivers parts of the transceiver stations are not collocated. This embodiment makes it easier to transmit and receive at the same time in the TDD mode of operation.

While the above description contains much specificity, these should not be construed as limitations on the scope, but rather as an exemplification of several embodiments thereof. It will be understood by one of ordinary skill in the art that the methods described herein can be modified and adapted for other applications, and these other modifications and adaptations will not depart from the scope hereof. The descriptions are intended to explain the appended claims.

The invention claimed is:

1. A method of synchronizing signal transmissions from a set of stations, including a plurality of stations, wherein a subset of stations have multiple antennas and optionally the method is applied to one or more of these antennas, to a predetermined target station, comprising: Identifying an antenna on one of the stations from the set of stations as a reference node, determining at the said reference node scaling factors, for one or more antennas on each of the remaining stations in the set of stations and for plurality of sub-carriers, based on the channel for signals received from the one or more antennas on the other stations in the set and the channel for the signal from the target station, and sending the corresponding scaling factors to the other stations in the set of stations via a data link, determining at the one or more antennas at each of the stations in the set of stations, except for the reference node, for the plurality of sub-carriers, a correction factor based on the scaling factors sent by the reference node over the data link and the channel of the signal received from the target station, and the channel of the signal received from the reference node station, correcting the signals transmitted to the target station from the one or more antennas of the stations in the set of stations, except for the reference node, for the plurality of sub-carriers, by the corresponding correction factor, and, for the case when there are multiple antennas on the same station as the reference node, for one or more of the other antennas in the same station as the reference node: determining a first correction factor with respect to an antenna on a different station in the set of stations, considering it as a temporary reference node, combining this said first correction factor with the correction factor previously determined for the temporary reference node, to give a final correction factor, correcting the signals transmitted to the target station by the final correction factor.

2. The method of claim 1, wherein the phase of the scaling factors and correction factors is utilized.

3. The method of claim 1, wherein a single carrier modulation is used.

4. The method of claim 1, wherein the said correction factor is combined with other processing and scaling of the signals.

5. The method of claim 1, wherein the target station has multiple antennas and the method is repeated for each of the antennas in the said target station.

6. The method of claim 1, wherein the transmitters of transceiver stations are turned off for periods of time to allow the receivers of the said transceiver stations to operate.

7. The method of claim 1, wherein multiple antennas in the same station are synchronized by using an antenna on a different station as a reference.

8. A method of synchronizing transmissions from two transceiver stations wherein one or both stations have multiple antennas, and optionally the method is applied one or more of these antennas, to a target transceiver station, comprising: determining at an antenna on the first station a scaling factor based on the channels for signals received from an antenna on the second station and the target station, determining at the antenna on the second station a scaling factor based on channels for signals received from the antenna on the first station and target station, correcting the signal transmitted from the antenna on the first station to the target station by the scaling factor calculated at the antenna on said first station, correcting the signal transmitted from the antenna on the second station to the target station by the scaling factor calculated at the antenna on said second station, and, for the case when there are multiple antennas on the first station, for one or more of the other antennas in the first station: determining at the other antenna on the first station a scaling factor based on the channels for signals received from an antenna on the second station and the target station, and combining this scaling factor with previously calculated scaling factors at this station, determining at the antenna on the second station a scaling factor based on channels for signals received from the other antenna on the first station and target station, and combining this scaling factor with previously calculated scaling factors at this station, correcting the signal transmitted from the other antenna on the first station to the target station by the scaling factor calculated at the first station, correcting the signal transmitted from the antenna on the second station to the target station by the scaling factor calculated at the second station.

9. The method of claim 8, wherein more than two stations are transmitting to the target stations.

10. The method of claim 8, wherein the phase of the scaling factors and correction factors is utilized.

11. The method of claim 8, wherein in the correction factor is combined with other processing and scaling of the signals.

12. The method of claim 8, wherein the transmitter and receivers parts of the transceiver stations are not collocated.

13. The method of claim 8, wherein the transmitters of transceiver stations are turned off for periods of time to allow the receivers of the said transceiver stations to operate.

* * * * *